United States Patent
Frankkila et al.

(10) Patent No.: US 9,078,166 B2
(45) Date of Patent: Jul. 7, 2015

(54) METHOD FOR DETERMINING AN AGGREGATION SCHEME IN A WIRELESS NETWORK

(75) Inventors: Tomas Frankkila, Luleå (SE); Yang Zuo, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 175 days.

(21) Appl. No.: 13/989,133

(22) PCT Filed: Nov. 30, 2010

(86) PCT No.: PCT/SE2010/051314
§ 371 (c)(1),
(2), (4) Date: May 23, 2013

(87) PCT Pub. No.: WO2012/074442
PCT Pub. Date: Jun. 7, 2012

(65) Prior Publication Data
US 2013/0250796 A1    Sep. 26, 2013

(51) Int. Cl.
*H04W 24/10*    (2009.01)
*H04L 12/841*   (2013.01)
*H04L 12/801*   (2013.01)

(52) U.S. Cl.
CPC .............. *H04W 24/10* (2013.01); *H04L 47/14* (2013.01); *H04L 47/28* (2013.01)

(58) Field of Classification Search
CPC ........ H04W 24/10; H04L 47/14; H04L 47/28
See application file for complete search history.

(56) References Cited

U.S. PATENT DOCUMENTS 7,460,524 B2    12/2008   Khan
2002/0122421 A1* 9/2002   Ambiehl et al. ............... 370/391
(Continued)

FOREIGN PATENT DOCUMENTS

EP          1538806 A2    6/2005
WO    WO 2009/146342 A1   12/2009

OTHER PUBLICATIONS

International Search Report, PCT/SE2010/051314, Sep. 8, 2011.
(Continued)

*Primary Examiner* — Brian D Nguyen
(74) *Attorney, Agent, or Firm* — Myers Bigel Sibley & Sajovec, P.A.

(57) ABSTRACT

A method and arrangement for employing media layer adaptation in a wireless communication of media in data packets from a sending node to a receiving node, by determining a fitting frame aggregation scheme in an effective and accurate manner. An arrival time AT and generation time GT are monitored for packets when received at the packet receiving node. A difference ATdiff in the arrival time of consecutive packets and a difference GTdiff in the generation time of the packets, are calculated. Then, an inter-arrival measure IA is calculated as the deviation between the arrival time difference ATdiff and generation time difference GTdiff. When the inter-arrival jitter exceeds a preset threshold (Th), a frame aggregation scheme is determined based on the calculated inter-arrival jitter IA and applied in the packet communication.

14 Claims, 4 Drawing Sheets

(56) References Cited

U.S. PATENT DOCUMENTS

| | | |
|---|---|---|
| 2004/0062278 A1* | 4/2004 | Hadzic et al. .................. 370/503 |
| 2004/0179475 A1* | 9/2004 | Hwang et al. .................. 370/229 |
| 2005/0122960 A1* | 6/2005 | Khan ............................. 370/352 |
| 2005/0163103 A1* | 7/2005 | Malomsoky et al. ......... 370/352 |
| 2007/0211625 A1* | 9/2007 | Liu et al. ........................ 370/229 |
| 2008/0080437 A1 | 4/2008 | Krishnaswamy et al. |
| 2010/0158007 A1 | 6/2010 | Kim et al. |
| 2010/0220615 A1* | 9/2010 | Enstrom et al. ............... 370/252 |
| 2010/0290454 A1* | 11/2010 | Lundberg ...................... 370/352 |

OTHER PUBLICATIONS

International Preliminary Report on Patentability, PCT/SE2010/051314, Oct. 1, 2012.

Lin et al.: "Frame aggregation and optimal frame size adaption for IEEE 802.11n. WLANs", GLOBECOM—IEEE Global Telecommunications Conference—IEEE GLOBECOM 2006—2006 Global Telecommunications Conference, 2007, 6 pp.

\* cited by examiner

| i | $AT_i$ [ms] | $GT_i$ [ms] | $ATdiff_{(i,i-1)}$ [ms] | $GTdiff_{(i,i-1)}$ [ms] | $IA_{(i,i-1)}$ [ms] |
|---|---|---|---|---|---|
| 0 | 85 | 40 | | | |
| 1 | 118 | 60 | 33 | 20 | 13 |
| 2 | 162 | 80 | 44 | 20 | 24 |
| 3 | 199 | 100 | 37 | 20 | 17 |
| 4 | 241 | 120 | 42 | 20 | 22 |
| 5 | 277 | 140 | 36 | 20 | 16 |
| 6 | 323 | 160 | 46 | 20 | 26 |

METHOD FOR DETERMINING AN AGGREGATION SCHEME IN A WIRELESS NETWORK

CROSS REFERENCE TO RELATED APPLICATION

This application is a 35 U.S.C. §371 national stage application of PCT International Application No. PCT/SE2010/051314, filed on 30 Nov. 2010, the disclosure and content of which is incorporated by reference herein in its entirety. The above-referenced PCT International Application was published in the English language as International Publication No. WO 2012/074442 A1 on 7 Jun. 2012.

TECHNICAL FIELD

The invention relates generally to a method and arrangement for media layer adaptation of a wireless channel used for a mobile terminal in communication with a base station of an access network, for improving the performance in said communication.

BACKGROUND

In wireless communication of media in IP (Internet Protocol) packets between a mobile terminal and a base station of a wireless access network, the concept of media layer adaptation is often employed at the packet sending node when quality-related problems are detected at the packet receiving node. In this description, the packet sending and receiving nodes will be referred to as "sender" and "receiver" for short, and the communication discussed may be either downlink or uplink.

Quality problems at the receiving side may arise due to varying channel conditions and/or congestion in the network resulting in changed data rates, which has an impact particularly for delay-sensitive real-time services such as VoIP (Voice over IP), video and interactive game applications. A media receiving end user may perceive a decreased data rate over the used wireless channel as impaired sound or image, and/or increased delays when the media is played out. In this description, the term "performance" refers to any quality impacting characteristics of the used channel that may be relevant in this context resulting in impaired quality when playing out the media at the media receiving end user.

The media layer adaptation technique of today involves different adaptation methods at the sender that are typically tried one by one to overcome the performance problems, based on a feedback mechanism where the receiver basically indicates to the sender if the reception quality is good or bad. Different adaptation methods can be applied at the sender, including: 1) "back-off in bit rate" by reduced source coding bit rate, 2) "frame aggregation" where multiple media frames are aggregated into a common physical frame which reduces the amount of protocol overhead, and 3) "redundancy" by transmitting the same information more than once.

These methods are thus introduced and tried one by one at the sender, preferably starting with the one most likely to succeed depending on what system is used. For example, a back-off in bit rate is effective in interference sensitive systems where the channel performance easily degrades when the amount of other interfering signals is high, such as HSPA (High Speed Packet Access) and LTE (Long Term Evolution), while frame aggregation is mostly helpful in packet rate sensitive systems, such as WLAN (Wireless local Area Network). Redundancy is typically helpful to improve performance in both types of systems but may result in increased network load and is therefore usually employed as a last measure when neither bit rate back-off nor frame aggregation is successful.

FIG. 1 illustrates how media layer adaptation is basically used for a voice communication between a sender 100 and a receiver 102 of communicated data packets, such as VoIP. In this figure, packet communication is represented by a thick arrow while control messaging is represented by thin arrows. The well-known speech codec AMR-NB (Adaptive Multi-Rate-Narrow Band) may be used by sender 100 and receiver 102 for encoding/decoding the communicated speech. The protocol RTP (Real Time Protocol) is typically used for communicating the data packets over the wireless channel. The sender 100 sends packets over a wireless channel to the receiver 102 which temporarily stores the received media data in a media buffer, not shown, before being decoded for playout. The receiver 102 also monitors the channel performance by measuring a suitable quality indicating parameter of the received packets, e.g. packet loss rate, or packet delay jitter.

When the monitored performance falls below an acceptable level, the receiver 102 selects a media layer adaptation method out of a plurality of available methods 1-3 and sends an adaptation request as feedback to the sender 100, suggesting the selected adaptation method. This request may be sent in a control message according to the well-known protocol RTCP (RTP Control Protocol). The sender 100 then applies the suggested adaptation method when sending further packets to the receiver 102 over the used channel. If the monitored performance still is unacceptable, the receiver 102 selects another media layer adaptation method from the available methods 1-3, and sends a new adaptation request to the sender 100 accordingly, and so forth.

As indicated above, an adaptation algorithm in the receiver 102 is typically configured to select and suggest the adaptation methods 1-3 in a certain preset order, depending on their likelihood to improve the performance in the channel used. In one example, the adaptation algorithm first tries to employ the back-off in bit rate, and if not successful it then tries to employ frame aggregation together with the backed-off bit rate. If this still does not improve the performance sufficiently, the adaptation algorithm tries redundancy.

This scheme works fairly well in the interference sensitive systems HSPA and LTE as the adaptation method most likely to be successful in these systems is tried first, i.e. the back-off in bit rate. However, for systems where reduced bit rate has no or very limited effect, it may take some time before the performance becomes acceptable, thus resulting in prolonged bad quality as perceived by the user(s) as well as excessive feedback signaling and processing. For example, WLAN systems are mainly packet rate sensitive and not very receptive to reduced bit rate, particularly when relatively small packets are used as in VoIP, although WLAN systems may in other cases actually be receptive to reduced bit rate, e.g. when the packets are relatively large such as video packets. The feedback mechanism is also somewhat time-consuming since the measurements and evaluation described above must be done over a sufficient amount of successive packets before trying another adaptation method, which is needed to ensure that the measurement basis for the analysis is stable and a too short analysis period increases the risk for applying a non-relevant adaptation method.

Further, if only the packet loss rate is measured as a quality indicating parameter, the output quality at the receiving side may be seriously impaired even when there are basically no packet losses and no performance problems can be detected by the monitoring function. This situation may occur for example when the network capacity only allows for a limited/reduced data throughput which is not sufficient to support the packet rate required by the service used. Instead of discarding packets, the sender decreases the packet sending rate to fit the reduced network capacity. As a result, the receiver will receive packets less frequent than expected and a shortage of packets in its media buffer occurs, referred to as "buffer under-run", which will naturally disturb playout of the media.

FIG. 2 illustrates schematically how frame aggregation works in the case of a VoIP service for communicating speech over a wireless channel. In this example, RTP is used for communicating data packets, often referred to as RTP packets, in the physical layer. 200 denotes a sequence of media frames created in the application layer, sometimes also referred to as data frames or content frames, to be packetized for transmission at the sender according to a frame scheme 202 of transmitted RTP packets 1-16 in the physical layer. A speech coder typically generates a media frame every 20 ms (millisecond).

When applying frame aggregation 204, the number of media frames in each RTP packet is basically increased to reduce the communication of overhead information per media frame, which may however increase the general delay between packet generation at the sender and packet reception at the receiver. In this example, a first shown packet 206a using a certain header size H contains two media frames 1-2 and packet 206a is transmitted from the sender as RTP packet 3 thus containing 40 ms of speech. By applying frame aggregation, the number of media frames accommodated into the next shown packet 206b is increased to four media frames 3-6 using the same header size H, and packet 206b is transmitted as a next RTP packet 10 thus containing 80 ms of speech. Thereby, the receiver will get media data more "densely", also reducing the total overhead communication in the form of packet headers. U.S. Pat. No. 7,460,524 B2 discloses how frame aggregation can be applied for a wireless channel to deal with excessive packet delay jitter.

As mentioned above, it is often a problem that the "best" media layer adaptation, or even an acceptable one, is not found at once but it can take some time before different methods are tested and evaluated to arrive at acceptable performance. When frame aggregation is applied, a less than optimal number of media frames may be tried in each transmitted packet, and may be necessary to try several different aggregation schemes in multiple transmitted packets before arriving at the best, or at least acceptable, performance. For example, if 1 frame/packet is currently used, a typical adaptation scheme would first try a frame aggregation of 2 frames/packet, evaluate the performance, then try 3 frames/packet, evaluate the performance, then try 4 frames/packet, and so forth, until it can be concluded that the best, or an acceptable, frame aggregation has been reached. The above delay of trying out different frame aggregations before a useful frame aggregation has been determined may be considerable, each try requiring a sufficient analysis period as mentioned above, thus resulting in prolonged performance problems at the media receiving end user.

SUMMARY

It is an object of the invention to address at least some of the problems outlined above. It is also an object to enable efficient determination of a useful frame aggregation scheme without excessive delays. It is possible to achieve these objects and others by using a method and an arrangement as defined in the attached independent claims.

According to one aspect, a method is provided for employing media layer adaptation for data packets communicated over a wireless channel between a packet sending node and a packet receiving node. In this method, an arrival time "AT" and a generation time "GT" are monitored for packets received at the receiving node. A difference "ATdiff" in the monitored arrival time is then calculated for consecutive packets, and a difference "GTdiff" in the monitored generation time is also calculated for consecutive packets.

The method further comprises calculating an inter-arrival measure "IA" indicating the difference or deviation between the arrival time difference ATdiff and generation time difference GTdiff calculated for a plurality of consecutive packets, that is: IA=ATdiff−GTdiff. When the inter-arrival measure IA exceeds a preset threshold Th, a frame aggregation scheme is applied in the packet communication, which frame aggregation scheme is determined based on the calculated inter-arrival measure IA. Thereby, a relevant and possibly even "the best" number of media frames per packet can be determined directly for use in the new frame aggregation scheme, that is without having to try different alternatives and measure the resulting performance which is much more time-consuming.

According to another aspect, an arrangement is provided in a packet receiving node, configured to employ media layer adaptation for data packets communicated over a wireless channel between a packet sending node and the packet receiving node. In the receiving node arrangement, a performance monitor is adapted to monitor arrival time and generation time for received packets. Further, an adaptation controller in the receiving node is adapted to calculate a difference ATdiff in the monitored arrival time for consecutive packets and a difference GTdiff in the monitored generation time for consecutive packets, and to calculate an inter-arrival measure IA indicating the difference or deviation between the arrival time difference ATdiff and generation time difference GTdiff calculated for a plurality of consecutive packets, that is IA=ATdiff−GTdiff. When the inter-arrival measure exceeds a preset threshold Th, the adaptation controller is further adapted to determine a frame aggregation scheme based on the calculated inter-arrival measure IA, and to send an adaptation request to the packet sending node to use the determined frame aggregation scheme in the packet communication.

The above method and arrangement may be configured and implemented according to different optional embodiments. In one possible embodiment, the packet receiving node calculates the arrival time difference ATdiff, generation time difference GTdiff and inter-arrival measure IA, determines the frame aggregation scheme, and sends an adaptation request to the packet sending node to use the frame aggregation scheme in the packet communication. In another alternative embodiment, depending on the implementation, the packet receiving node calculates the arrival time difference ATdiff, generation time difference GTdiff and inter-arrival measure IA, and reports the calculated inter-arrival measure IA to the packet sending node. The packet sending node is then able to determine the frame aggregation from the reported inter-arrival measure IA if it exceeds the preset threshold Th.

The inter-arrival measure may be an average inter-arrival jitter calculated from the arrival time difference ATdiff and the generation time difference GTdiff over said plurality of consecutive packets. Alternatively, the inter-arrival measure IA may be any of: a maximum inter-arrival jitter IA(max), a median inter-arrival jitter IA(med), and a representative IA value based on a preset percentile calculated for the plurality of consecutive packets.

In further possible embodiments, the packet receiving node monitors the generation time of the received packets by determining a time stamp or media frame number of the received packets. The frame aggregation scheme may be determined by calculating a number of media frames N for changing a current number of media frames per packet CF, as:

$$N = \left\lceil \frac{IA}{frame\_length} \right\rceil,$$

where ⌈x⌉ indicates a ceiling function that approximates x up to the nearest integer value. A new number of media frames per packets NF to use is then calculated as: NF=N+CF.

It may further be determined whether the inter-arrival measure exceeds the preset threshold (Th) by filtering out calculated samples of inter-arrival measure IA by means of an MA, AR or ARMA filer.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Figure 1:
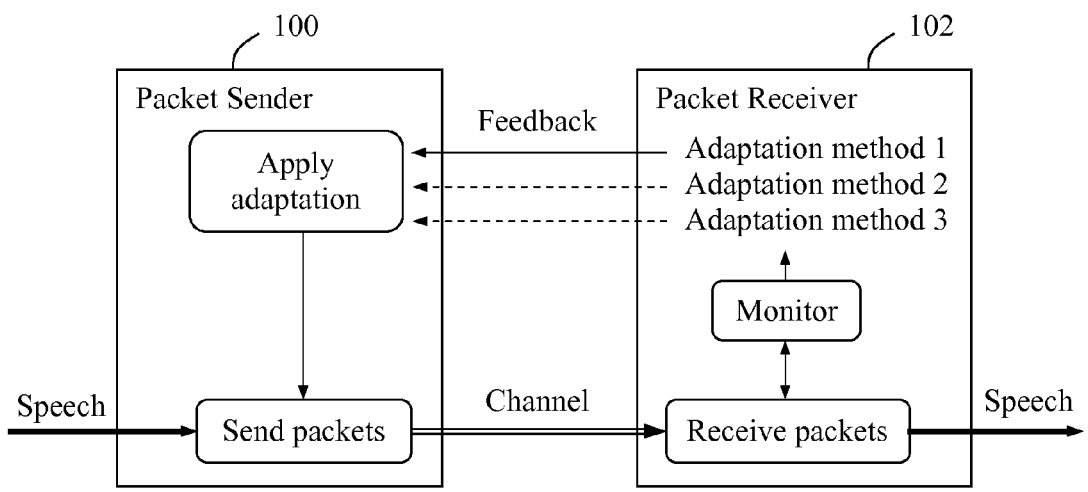
FIG. 1 is a block diagram illustrating a scheme for media layer adaptation, according to the prior art.
Figure 2:
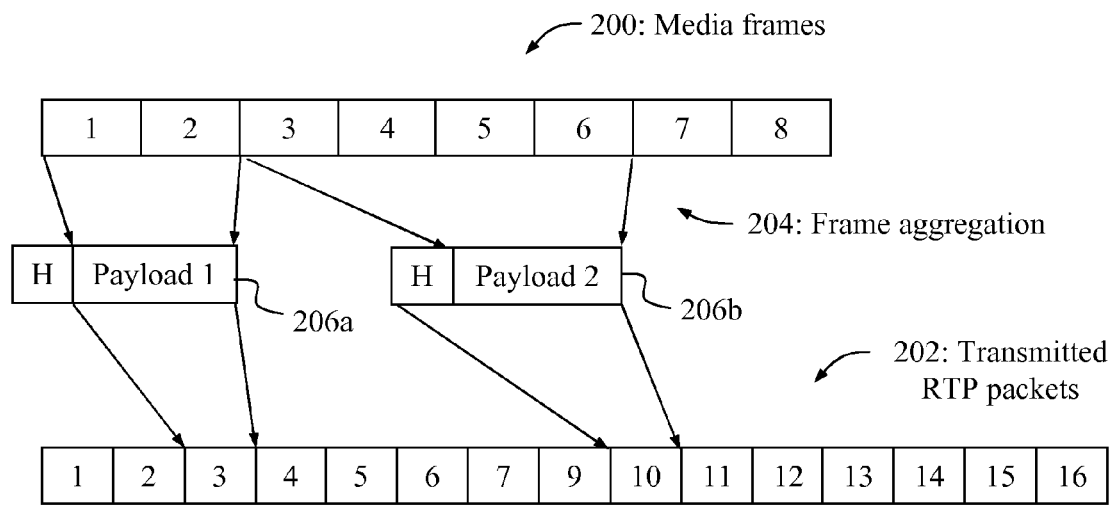
FIG. 2 illustrates schematically an example of how frame aggregation can be employed, according to the prior art.

Briefly described, a solution is provided to employ media layer adaptation by determining a fitting frame aggregation scheme in an effective and accurate manner. An example of how this can be done will now be described with reference to the flow chart in FIG. 3. It is assumed that data packets containing media are communicated over a wireless channel between a packet sending node and a packet receiving node, or a sender and a receiver for short, and that media frames created in an application layer are packetized by fitting them into data packets for transmission from the sender. The media may be voice and/or video to be played out at the sender by any suitable playout equipment, without limitation in this invention. The actions in FIG. 3 may be executed either in the receiver basically, or partly in the receiver and partly in the sender, as will be explained below.

In a first shown action 300, the receiver monitors and registers an arrival time "AT" and a generation time "GT" for the received packets, i.e. AT is the time the packets are physically received at the receiver and GT is the time the packets are "generated" at the sender. GT could be indicated by a time stamp attached to each packet when generated, or a media frame number likewise attached to each packet which is common practice according to regular transmission protocols such as RTP. When a fixed frame length is used, the media frame number corresponds to the time of generating the packet.

In a next action 302, the receiver calculates a difference "ATdiff" in the monitored arrival time for consecutive packets, i.e. the AT(i) of one received packet i minus the AT(i−1) of the immediately preceding packet i−1, so that ATdiff(i,i−1) is the time span between reception of packets i−1 and i at the receiver. A further action 304 illustrates that the receiver also calculates a difference "GTdiff" in the monitored generation time for the consecutive packets, i.e. the GT(i) of a received packet i minus the GT(i−1) of the immediately preceding packet i−1, e.g. by determining the time stamp or frame number of the packet. Thus, GTdiff(i,i−1) is the time span between generation of packets i−1 and i at the sender. ATdiff and GTdiff are calculated for a plurality of consecutive packets, in this example n packets, where n may be selected to provide a useful basis for determining a proper frame aggregation as follows. It should be noted that actions 302 and 304 can be executed independent of each other, e.g. in parallel and not necessarily in the illustrated order.

In a further action 306, the receiver calculates an inter-arrival measure "IA" indicating the difference or deviation between the arrival time difference ATdiff and generation time difference GTdiff calculated for a plurality of consecutive packets, that is:

$$IA = ATdiff - GTdiff \qquad (1)$$

for the n consecutive packets. As a result, a value of IA is calculated for each pair of consecutive packets i−1 and i in the sequence of n packets, and an IA value representative for the range of n packets may be determined from the above calculated IA values for further evaluation in this procedure. In the following, the general term "inter-arrival measure" IA is used to represent one or more values of inter-arrival jitter and/or one or more pairs of values of arrival time difference ATdiff and generation time difference GTdiff.

For example, the representative IA value or inter-arrival measure may be an average inter-arrival jitter $\overline{IA}$ of the IA values calculated in action 306 from the arrival time difference ATdiff and the generation time difference GTdiff according to (1) over the n consecutive packets i−1, i:

$$\overline{IA} = \frac{\sum_{i=1}^{n} IA_{(i,i-1)}}{n} \qquad (2)$$

In another example, the representative IA value or inter-arrival measure may be a maximum inter-arrival jitter "IA (max)" of the IA values calculated for consecutive packets in the sequence of n packets, thereby representing the "worst case" of the greatest deviation between the arrival and generation time differences in the range of n packets. In yet another example, the representative IA value or inter-arrival measure may be a median inter-arrival jitter "IA(med)" of the IA values calculated for consecutive packets in the sequence of n packets.

Alternatively, the representative IA value or inter-arrival measure may be based on a preset "percentile" calculated for the plural consecutive packets n, e.g. a percentile of 90%, meaning that if 90% of the IA values in the range are below a value "x" and the remaining 10% of the IA values are above x, the value x is used as the representative IA value. Any fitting percentile value may be used in the above alternative.

In another example, when evaluating the IA parameter or inter-arrival measure against the threshold Th, it may be checked if the individual IA values or samples are consistently greater than Th by applying a condition that at least a preset percentage of the IA values in the range n must exceed the threshold. Further, when determining whether the IA parameter exceeds Th, deviant and non-representative samples of IA can be filtered by running the IA samples through an MA (Moving Average), AR (AutoRegressive) or ARMA (AutoRegressive and Moving Average) filter.

In a next action 308, it is determined if the inter-arrival measure, e.g. the representative IA value determined according to any of the above alternatives, exceeds a preset threshold "Th" or not The threshold Th has been selected as an indication of whether quality problems can be anticipated when playing out the media due to excessive jitter at the receiver, e.g. when a shortage of packets can occur in the media buffer, and whether frame aggregation could be effective to improve the channel performance by reducing the jitter. If the parameter IA exceeds the threshold Th, the communication can be deemed packet rate sensitive, such as in WLAN communication when frame aggregation is mostly helpful as mentioned above. If not, the procedure may return to action 300 for further monitoring and registration of AT and GT for a next sequence of n received packets, for evaluation of the ongoing packet communication.

On the other hand, if the inter-arrival measure does exceed the threshold Th in action 308, a next action 310 illustrates that a new and more fitting frame aggregation scheme is determined based on the just considered inter-arrival measure, which may be done as follows. It is assumed that a certain number of media frames "CF" are currently incorporated in each transmitted packet, which may be a default number of frames, e.g. one or two frames, that the sender starts to use in each transmitted packet according to prescribed routines.

The new frame aggregation scheme, hopefully useful to remedy the anticipated quality problems by reducing the inter-arrival jitter, may be determined by calculating a number of media frames "N" to be used for changing the current number of media frames per packet "CF", as:

$$N = \left\lceil \frac{IA}{frame\_length} \right\rceil \quad (3)$$

where $\lceil x_1 \rceil$ indicates a ceiling function that approximates x up to the nearest integer value. The parameter "frame_length" is the length of the media frames created by the encoder at the sender for packetization and transmission to the receiver, which may be stipulated for the particular type of codec used in this communication.

A new number of media frames per packets "NF" to incorporate in each transmitted packet, can now be calculated as:

$$NF = N + CF \quad (4)$$

For example, N may be calculated to be 2, and in that case two more media frames should be added to the number of frames currently used in each packet Some realistic calculation examples for determining NF will be presented later below. A final shown action 312 indicates that the new frame aggregation scheme determined above is used, i.e. implemented or employed, in the ongoing communication.

As mentioned above, different alternatives of where to implement the actions 300-312 are possible. One option is to execute all actions 300-310 in the receiver which then "uses" the determined frame aggregation in action 312 by sending an adaptation request to the sender commanding the latter to employ the new frame aggregation when transmitting packets. In this way, the evaluation operation is performed by the receiver. For example, the adaptation request may be sent in a regular RTCP control message for frame aggregation referred to as "RTCP_APP_REQ_AGG" or "frame aggregation request". The data field in this message is a 4 bit value field in which different number of media frames per packet can be specified.

Another option is to execute at least actions 300-306 in the receiver which then reports the IA values calculated for each pair of consecutive packets, or a value representative thereof such as an average IA value if the inter-arrival measure exceeds the threshold Th in action 308, to the sender. The determination and usage actions 310 and 312, respectively, will then be executed at the sender thus moving the evaluation operation to the sender.

Figures 3, 4:
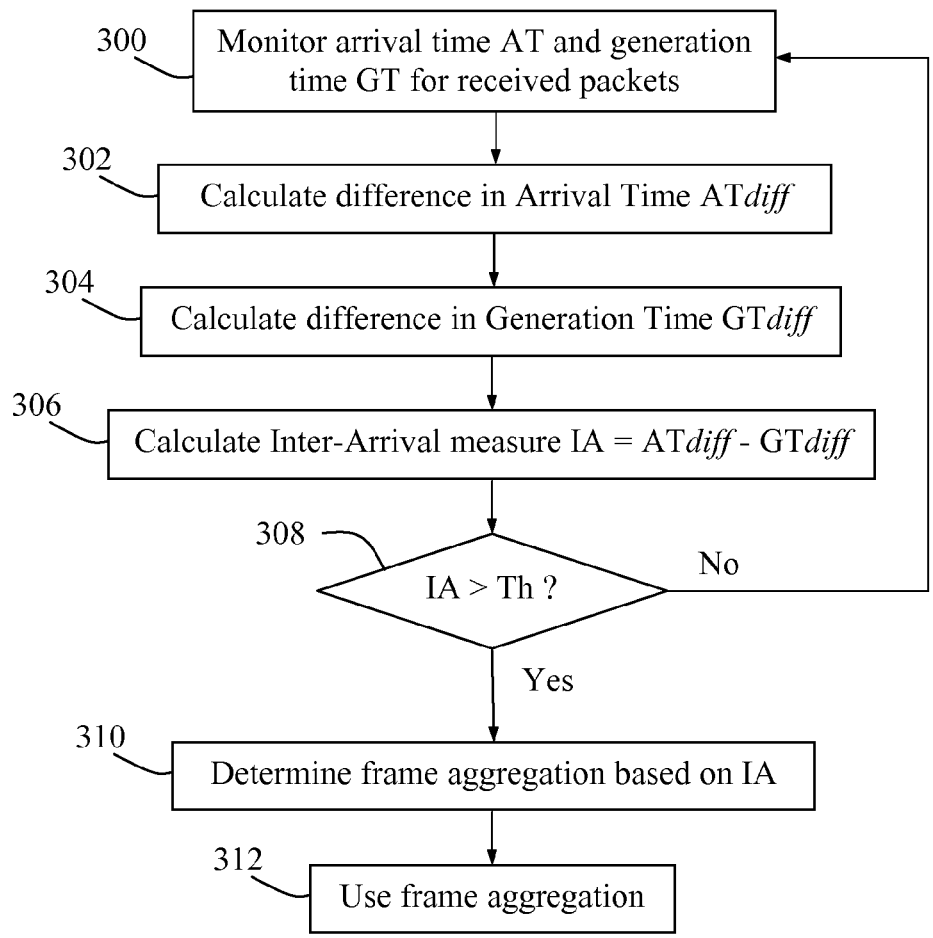
FIG. 3 is a flow chart of a procedure for applying media layer adaptation for a wireless channel by means of frame aggregation, according to some possible embodiments.
FIGS. 4 and 5 are diagrams with calculation examples for media layer adaptation by means of frame aggregation when basically using the procedure in FIG. 3, according to further possible embodiments.
Figures 5, 6:
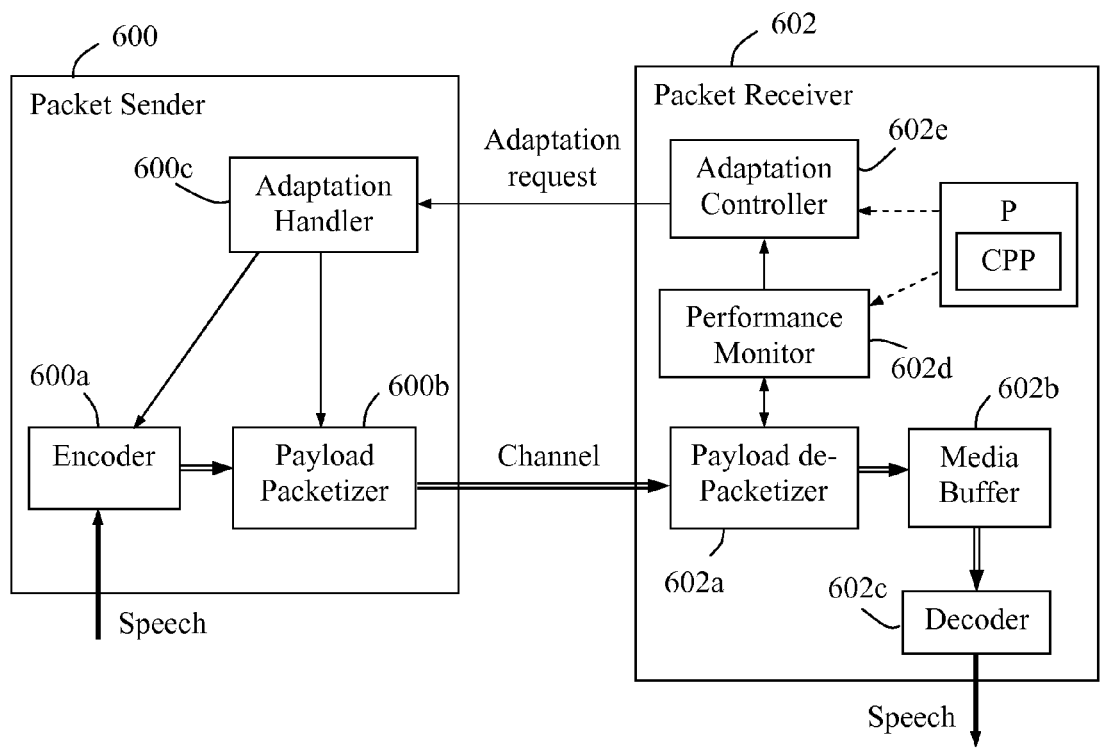
FIG. 6 is a block diagram illustrating an example of configuring a packet sender and a packet receiver, according to further possible embodiments.

FIGS. 4 and 5 are two example tables illustrating determination of the different parameters discussed above, expressed in milliseconds, for a sequence of communicated packets i=0-6, i.e. seven packets are considered for evaluation and n=6 pairs of consecutive packets. In these examples, the inter-arrival measure IA is an inter-arrival jitter. In FIG. 4, the first packet in the sequence i=0 is received at AT(0)=42 ms and was generated at GT(0)=40 ms. The next packet i=1 is received at AT(1)=57 ms and was generated at GT(1)=60 ms, and ATdiff(1,0) is thus 57−42=15 and GTdiff(1,0) is 60−40=20. As a result, the inter-arrival jitter IA(1,0) for the first two packets is 15−20=−5, using formula (1) above.

In this way, corresponding calculations are made for all six pairs of consecutive packets, resulting in a range of sample IA values disclosed in the rightmost column. The average of these samples is −1/6, using formula (2) above, which is close to zero. Assuming that the jitter threshold Th has been set to 10 ms, IA does not exceed Th and it is therefore not motivated to introduce and employ frame aggregation, or to change a currently used frame aggregation. It should be noted that the packets are generated at regular intervals by the sender, every 20 ms in this case, thus resulting in the same value of GTdiff (i,i−1) for every pair of consecutive packets, namely 20 ms. Only the difference in arrival time ATdiff varies e.g. due to changing channel conditions. For example, the above-mentioned speech codec AMR-NB employs a fixed frame length of 20 ms. However, this solution is generally not limited to codecs with fixed frame length only.

FIG. 5 is another example of the same parameters which are determined in an analogous manner and in this case, the sample IA values in the rightmost column are consistently greater than zero. The representative average value of the IA samples is now 118/6=19.667 ms which actually exceeds the preset threshold Th of 10 ms, thus indicating that the channel is packet rate limited. Since the receiver evidently receives the packets at a lower rate than the rate by which they were generated at the sender, the low reception rate will likely result in buffer under-run, i.e. shortage of data in the receivers media buffer causing quality problems when playing out the media from the buffer. Therefore, frame aggregation should be employed based on the calculated average IA value of 19.667 as follows.

Using formulas (3) and (4) above, and assuming that the current number of media frames per packet CF is 1 and given that the "frame_length" used is 20 ms, the new frame aggregation scheme can be determined by first calculating the parameter N for adjusting the number of media frames according to (3):

$$N = \left\lceil \frac{19.667}{20} \right\rceil$$

Thus, N=1 in this case and the new frame aggregation to employ is NF=1+1=2 according to (4), and consequently two media frames should be incorporated in each packet instead of one to obtain a proper balance in the media buffer, and the receiver may accordingly send an adaptation request to the sender to switch from one frame per packet to using two media frames per packet.

It may also happen that when a frame aggregation scheme is already in use, the N parameter may become negative such that it would be an improvement for the channel performance to decrease the current number of media frames per packet, e.g. from two frames back to one frame, so that the media data is more evenly distributed over the packets to obtain proper balance in the media buffer and a smoother reception of data.

With reference to the block diagram in FIG. 6, an arrangement in a packet receiving node 602 will now be described, being referred to as "receiver 602" for short The receiver 602 is configured to employ media layer adaptation for packets communicated over a wireless channel between a packet sending node 600 and the packet receiving node 602. This arrangement may be implemented basically as an application in the receiver 602 which can be configured to basically operate in accordance with any of the examples described for FIGS. 3-5 whenever appropriate.

FIG. 6 illustrates that the sender 600 comprises a media encoder 600a and a payload packetizer 600b which creates data packets from payload data coming from the media encoder 600a, and that the packets are transmitted over the wireless channel towards the receiver 602. The sender 600 also comprises an adaptation handler 600c which is configured to employ frame aggregation in accordance with information received from the receiver 602, in this case illustrated as an adaptation request. At least in some embodiments, the units 600a-c in sender 600 may be comprised of any conventional components capable of handling data packets for transmission and of employing frame aggregation in the manner described.

The receiver 602 comprises a payload de-packetizer 602a which extracts payload data from received data packets. The payload data can then be temporarily stored in a media buffer 602b before being decoded by a decoder 602c and played out by some suitable playout equipment, not shown. Likewise, the units 602a-c in receiver 602 may be comprised of any conventional components capable of handling received data packets in the manner described.

According to this arrangement, the receiver 602 further comprises a performance monitor 602d adapted to monitor the arrival time AT and generation time GT for received packets, e.g. as described above for action 300 in FIG. 3. The receiver 602 also comprises an adaptation controller 602e adapted to calculate a difference ATdiff in the monitored arrival time for consecutive packets, to calculate a difference GTdiff in the monitored generation time for consecutive packets, and to calculate an inter-arrival measure IA indicating the difference or deviation between the arrival time difference ATdiff and generation time difference GTdiff calculated for a plurality of consecutive packets: IA=ATdiff−GTdiff. These calculations made by the adaptation controller 602e may be made basically in the manner described for FIGS. 3-5 above.

When it is detected that the inter-arrival measure exceeds a preset threshold Th, the adaptation controller 602e is further adapted to determine a frame aggregation scheme based on the calculated inter-arrival measure IA, and to send an adaptation request to the sender 600 for applying the determined frame aggregation scheme in the packet communication. Alternatively, the calculated inter-arrival measure IA may be reported to the sender, e.g. as plural sample values of IA or a single representative IA value determined according to any of the above-described alternatives, such that the sender determines the frame aggregation scheme based on the reported inter-arrival measure IA.

The different modules in the packet receiving node 602 may be configured and adapted to provide further optional features and embodiments. In one example embodiment, the adaptation controller 602e is further adapted to calculate the inter-arrival measure IA as an average inter-arrival jitter from the arrival time difference ATdiff and the generation time difference GTdiff over the n consecutive packets, according to formula (2) above. Alternatively, the adaptation controller 602e may determine the inter-arrival measure IA as any of: a maximum inter-arrival jitter IA(max), a median inter-arrival jitter IA(med), and a representative IA value based on a preset percentile calculated for said plurality of consecutive packets.

The performance monitor 602d may be further adapted to monitor the generation time of the received packets by determining a time stamp or media frame number of the received packets. In another possible embodiment, the adaptation controller 602e is further adapted to determine the frame aggregation scheme by calculating a number of media frames N for changing a current number of media frames per packet CF, according to formula (3) above. The adaptation controller 602e may also be adapted to calculate a new number of media frames per packets NF to use according to formula (4) above.

In another possible embodiment, the adaptation controller 602e is further adapted to determine whether the inter-arrival measure exceeds the preset threshold Th by filtering out calculated samples of inter-arrival jitter IA by means of an MA, AR or ARMA filter.

It should be noted that FIG. 6 merely illustrates various functional modules or units in the receiver 602 in a logical sense, although the skilled person is free to implement these functions in practice using suitable software and hardware means. Thus, the invention is generally not limited to the shown structures of the receiver 602, while its functional modules 602d-e may be configured to operate according to the features described for FIGS. 3-5 above and FIGS. 7 and 8 below, where appropriate.

The functional modules 602d-e described above can be implemented in the receiver 602 as program modules of a computer program comprising code means which when run by a processor P in the receiver 602 causes the receiver 602 to perform the above-described functions and actions. The processor P may be a single CPU (Central processing unit), or could comprise two or more processing units. For example, the processor P may include general purpose microprocessors, instruction set processors and/or related chips sets and/ or special purpose microprocessors such as ASICs (Application Specific Integrated Circuit). The processor P may also comprise memory for caching purposes.

The computer program may be carried by a computer program product CPP in the receiver 602 connected to the processor P. The computer program product CPP comprises a computer readable medium on which the computer program is stored. For example, the computer program product CPP may be a flash memory, a RAM (Random-access memory), a ROM (Read-Only Memory) or an EEPROM (Electrically Erasable Programmable ROM), and the program modules could in alternative embodiments be distributed on different computer program products in the form of memories within the receiver 602.

Figure 7:
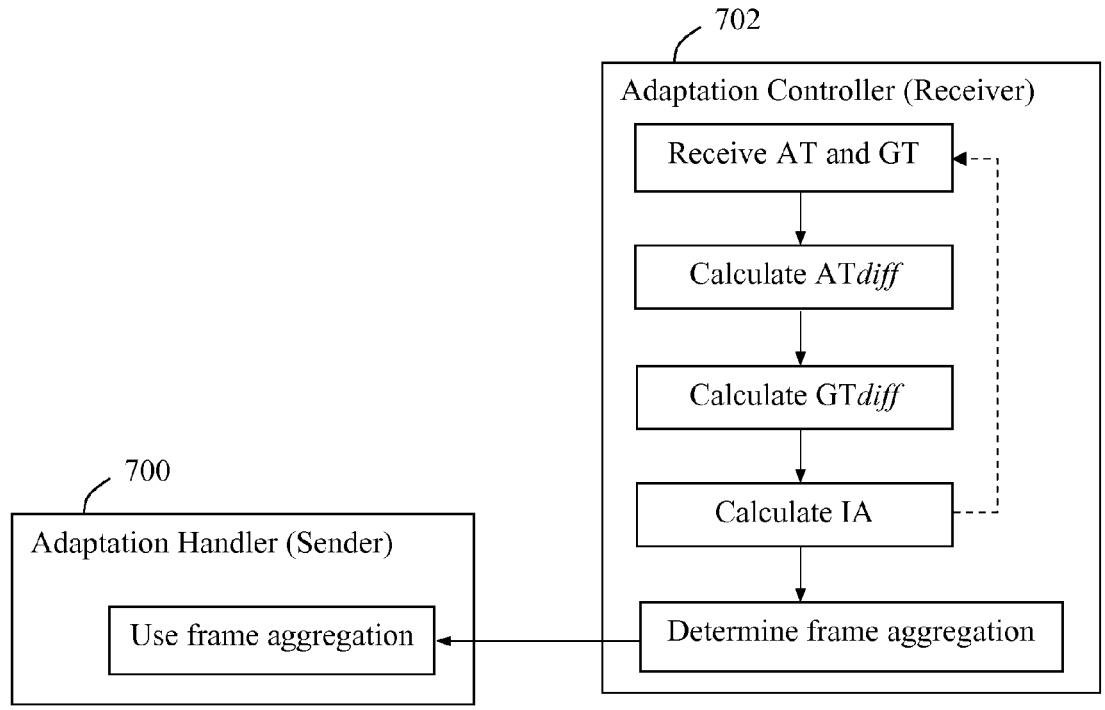
FIGS. 7 and 8 are schematic block diagrams illustrating action flows in a packet sender and a packet receiver, according to two optional embodiments.

With reference to the configuration shown in FIG. 6, FIG. 7 illustrates a similar case when an adaptation controller 702 in a packet receiving node receives values of AT and GT monitored and registered for a pair of consecutive packets received from a packet sending node, calculates ATdiff for the packet pair, calculates GTdiff for said packet pair, and calculates IA for the packet pair. This process is repeated for a further received packets, and adaptation controller 702 then determines a frame aggregation scheme based on the calculated IA values. Adaptation controller 702 finally sends the determined frame aggregation scheme in an adaptation request or the like to an adaptation handler 700 in the packet sending node, which in turn uses or applies the frame aggregation scheme when sending further packets to the packet receiving node.

Figure 8:
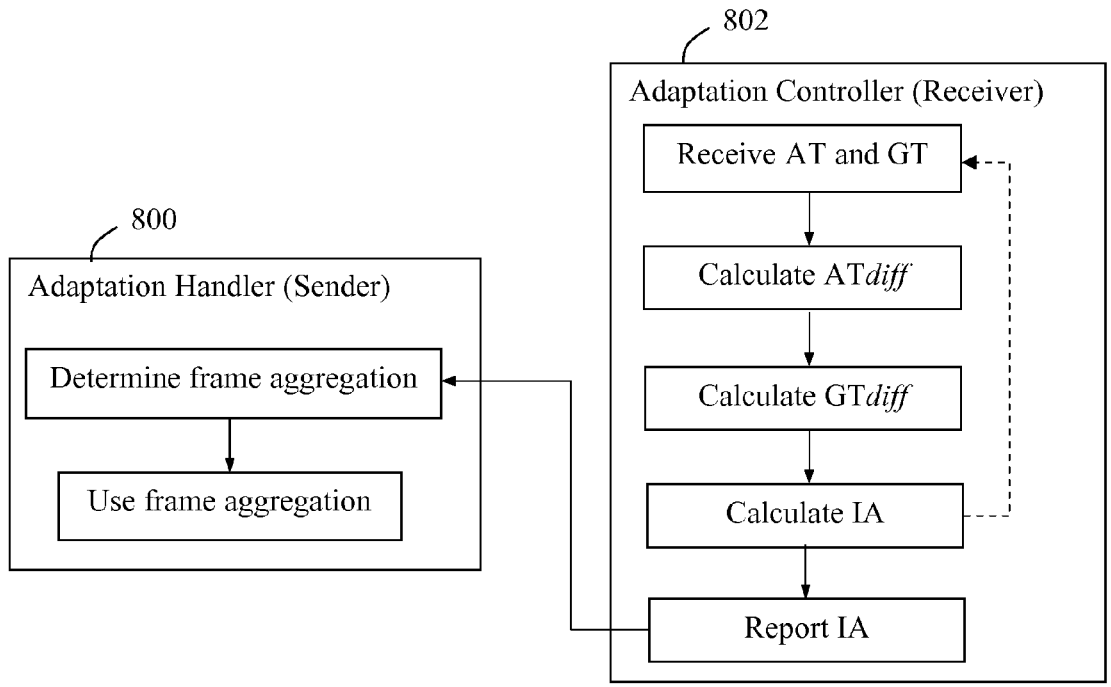

FIG. 8 illustrates a slightly modified example when an adaptation controller 802 in a packet receiving node receives values of AT and GT monitored and registered for a pair of consecutive packets received from a packet sending node, calculates ATdiff for the packet pair, calculates GTdiff for the packet pair, and calculates IA for the packet pair. This process is repeated for further received packets, and adaptation controller 802 reports the calculated IA values or a value representative thereof to an adaptation handler 800 in the packet sending node. Adaptation handler 800 then determines a frame aggregation scheme based on the received IA values or representative value thereof, and uses or applies the frame aggregation scheme when sending further packets to the packet receiving node.

Some advantages that may be achieved with this novel procedure and arrangement for employing media layer adaptation for data packets communicated over a wireless channel, as compared to conventional solutions, may include:

1) It can be determined quite rapidly whether frame aggregation is useful to employ to overcome any anticipated or detected quality problems at the receiver.

2) A proper and even optional frame aggregation scheme, i.e. the number of media frames to use per packet, can also be determined immediately without having to try different alternatives and measure the resulting performance which is much more time-consuming.

3) The calculations required for determining a proper and even optional frame aggregation scheme are relatively simple to execute, thus making very moderate demands for processing capacity.

4) This solution is not limited to any particular types of media or codec.

While the invention has been described with reference to specific exemplary embodiments, the description is generally only intended to illustrate the inventive concept and should not be taken as limiting the scope of the invention. In particular, the examples above are mostly directed to the communication of speech although the described solution may be used for any other type of media. The invention is defined by the appended claims.

The invention claimed is:

1. A method performed in a packet receiving node of employing media layer adaptation for data packets communicated over a wireless channel between a packet sending node and the packet receiving node, wherein each communicated data packet comprises one or more media frames created in an application layer of the packet sending node, the method comprising:

monitoring arrival time AT and generation time GT for packets received at the receiving node, calculating a difference ATdiff in the monitored arrival time for consecutive packets, calculating a difference GTdiff in the monitored generation time for consecutive packets, calculating an inter-arrival measure IA indicating the difference or deviation between the arrival time difference ATdiff and generation time difference GTdiff calculated for a plurality of consecutive packets, that is: IA=ATdiff−GTdiff, and when the inter-arrival measure exceeds a preset threshold (Th), applying a frame aggregation scheme in said packet communication, said frame aggregation scheme being determined based on the calculated inter-arrival measure IA.

2. A method according to claim 1, wherein the packet receiving node calculates said arrival time difference ATdiff; generation time difference GTdiff and inter-arrival measure IA, determines said frame aggregation scheme, and sends an adaptation request to the packet sending node to use said frame aggregation scheme in said packet communication.

3. A method according to claim 1, wherein the packet receiving node calculates said arrival time difference ATdiff; generation time difference GTdiff and inter-arrival measure IA, and reports the calculated inter-arrival measure IA to the packet sending node, and the packet sending node determines said frame aggregation if the reported inter-arrival measure IA exceeds the preset threshold (Th).

4. A method according to claim 1, wherein said inter-arrival measure is an average inter-arrival jitter $\overline{IA}$ calculated from the arrival time difference ATdiff and the generation time difference GTdiff over n consecutive packets i-1, i:

$$\overline{IA} = \frac{\sum_{i=1}^{n} IA_{(i,i-1)}}{n}.$$

5. A method according to claim 1, wherein said inter-arrival measure IA is any of: a maximum inter-arrival jitter IA(max), a median inter-arrival jitter IA(med), and a representative IA value based on a preset percentile calculated for said plurality of consecutive packets.

6. A method according to claim 1, wherein the packet receiving node monitors said generation time of the received packets by determining a time stamp or media frame number of the received packets.

7. A method according to claim 1, wherein said frame aggregation scheme is determined by calculating a number of media frames N for changing a current number of media frames per packet CF, as:

$$N = \left\lceil \frac{IA}{frame\_length} \right\rceil,$$

where the brackets represent a ceiling function that approximates IA/frame length up to the nearest integer value, and a new number of media frames per packets NF to use is calculated as: NF=N+CF.

8. A method according to claim 1, wherein it is determined whether the inter-arrival measure exceeds the preset threshold (Th) by filtering out calculated samples of inter-arrival measure IA by means of an MA (Moving Average), AR (AutoRegressive) or ARMA (AutoRegressive or Moving Average) filter.

9. An arrangement in a packet receiving node configured to employ media layer adaptation for data packets communicated over a wireless channel between a packet sending node and the packet receiving node, wherein each communicated data packet comprises one or more media frames created in an application layer of the packet sending node, the arrangement comprising:

a performance monitor adapted to monitor arrival time and generation time for received packets, and an adaptation controller adapted to calculate a difference ATdiff in the monitored arrival time for consecutive packets, to calculate a difference GTdiff in the monitored generation time for consecutive packets, and to calculate an inter-arrival measure IA indicating the difference or deviation between the arrival time difference ATdiff and generation time difference GTdiff calculated for a plurality of consecutive packets: IA=ATdiff−GTdiff;

the adaptation controller being further adapted to, when the inter-arrival measure exceeds a preset threshold (Th), determine a frame aggregation scheme based on the calculated inter-arrival measure IA, and send an adaptation request to the packet sending node to use the determined frame aggregation scheme in said packet communication.

10. An arrangement according to claim 9, wherein the adaptation controller is further adapted to calculate said inter-arrival measure IA as an average inter-arrival jitter $\overline{IA}$ from the arrival time difference ATdiff and the generation time difference GTdiff over n consecutive packets i-1, i:

$$\overline{IA} = \frac{\sum_{i=1}^{n} IA_{(i,i-1)}}{n}.$$

11. An arrangement according to claim 9, wherein said inter-arrival measure IA is any of: a maximum inter-arrival jitter IA(max), a median inter-arrival jitter IA(med), and a representative IA value based on a preset percentile calculated for said plurality of consecutive packets.

12. An arrangement according to claim 9, wherein the performance monitor is further adapted to monitor said generation time of the received packets by determining a time stamp or media frame number of the received packets.

13. An arrangement according to claim 9, wherein the adaptation controller is further adapted to determine said frame aggregation scheme by calculating a number of media frames N for changing a current number of media frames per packet CF, as:

$$N = \left\lceil \frac{IA}{frame\_length} \right\rceil,$$

where the brackets represent a ceiling function that approximates IA/frame length up to the nearest integer value, and a new number of media frames per packets NF to use is calculated as: NF=N+CF.

14. An arrangement according to claim 9, wherein the adaptation controller is further adapted to determine whether the inter-arrival measure exceeds the preset threshold (Th) by filtering out calculated samples of inter-arrival jitter IA by means of an MA (Moving Average), AR (AutoRegressive) or ARMA (AutoRegressive or Moving Average) filter.

* * * * *

UNITED STATES PATENT AND TRADEMARK OFFICE
CERTIFICATE OF CORRECTION

| | | |
|---|---|---|
| PATENT NO. | : 9,078,166 B2 | Page 1 of 1 |
| APPLICATION NO. | : 13/989133 | |
| DATED | : July 7, 2015 | |
| INVENTOR(S) | : Frankkila et al. | |

It is certified that error appears in the above-identified patent and that said Letters Patent is hereby corrected as shown below:

In the Specification:

In Column 8, Line 60, delete "receivers" and insert -- receiver's --, therefor.

In the Claims:

In Column 12, Line 18, in Claim 2, delete "ATdiff;" and insert -- ATdiff, --, therefor.

In Column 12, Line 24, in Claim 3, delete "ATdiff;" and insert -- ATdiff, --, therefor.

In Column 12, Line 56, in Claim 7, delete "IA/frame length" and insert -- IA/frame_length --, therefor.

In Column 13, Lines 12-13, in Claim 9, delete "IA=ATdiff-GTdiff;" and insert
-- IA=ATdiff-GTdiff, --, therefor.

In Column 14, Line 21, in Claim 13, delete "IA/frame length" and
insert -- IA/frame_length --, therefor.

Signed and Sealed this
Twenty-third Day of August, 2016

Michelle K. Lee
*Director of the United States Patent and Trademark Office*